Sept. 7, 1926.

G. J. FLETCHER ET AL

VEHICLE SPRING SUPPORT

Filed Jan. 2, 1925   3 Sheets-Sheet 1

1,598,679

Geo. J. Fletcher
W. M. James.
INVENTORS

BY Victor J. Evans
ATTORNEY

Sept. 7, 1926.  
G. J. FLETCHER ET AL  
1,598,679  
VEHICLE SPRING SUPPORT  
Filed Jan. 2, 1925  3 Sheets-Sheet 2
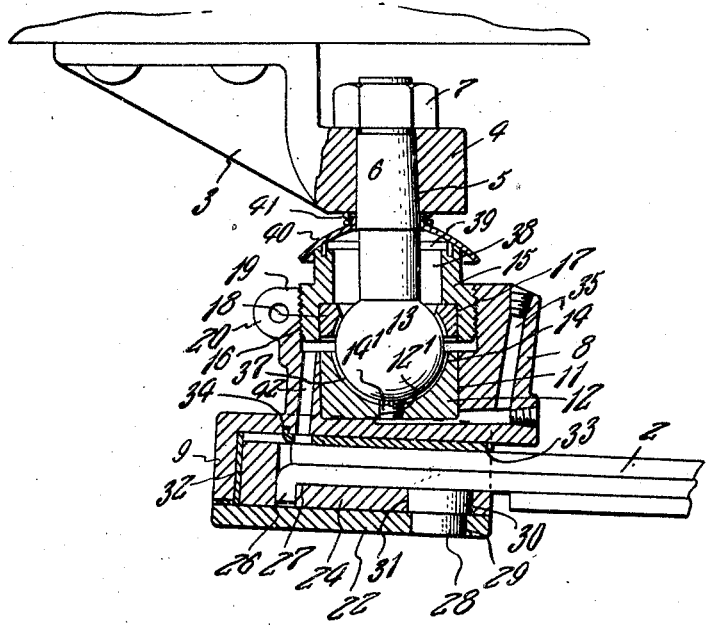
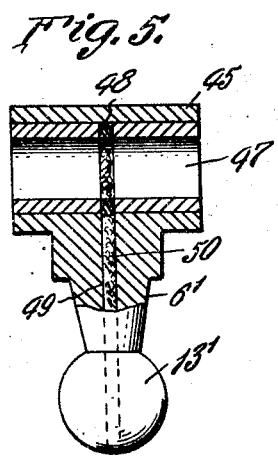
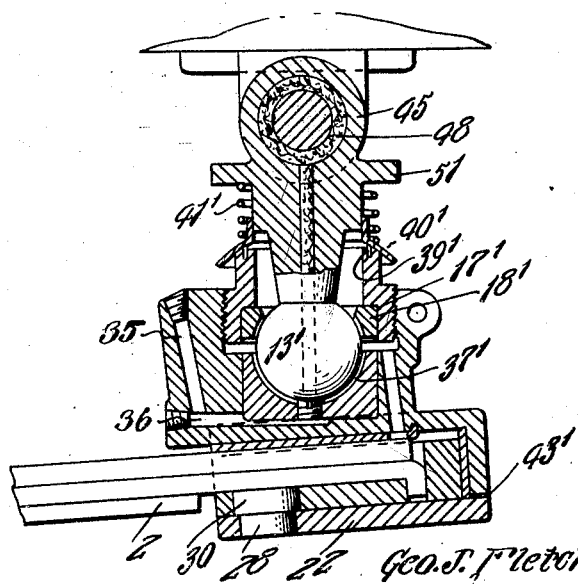

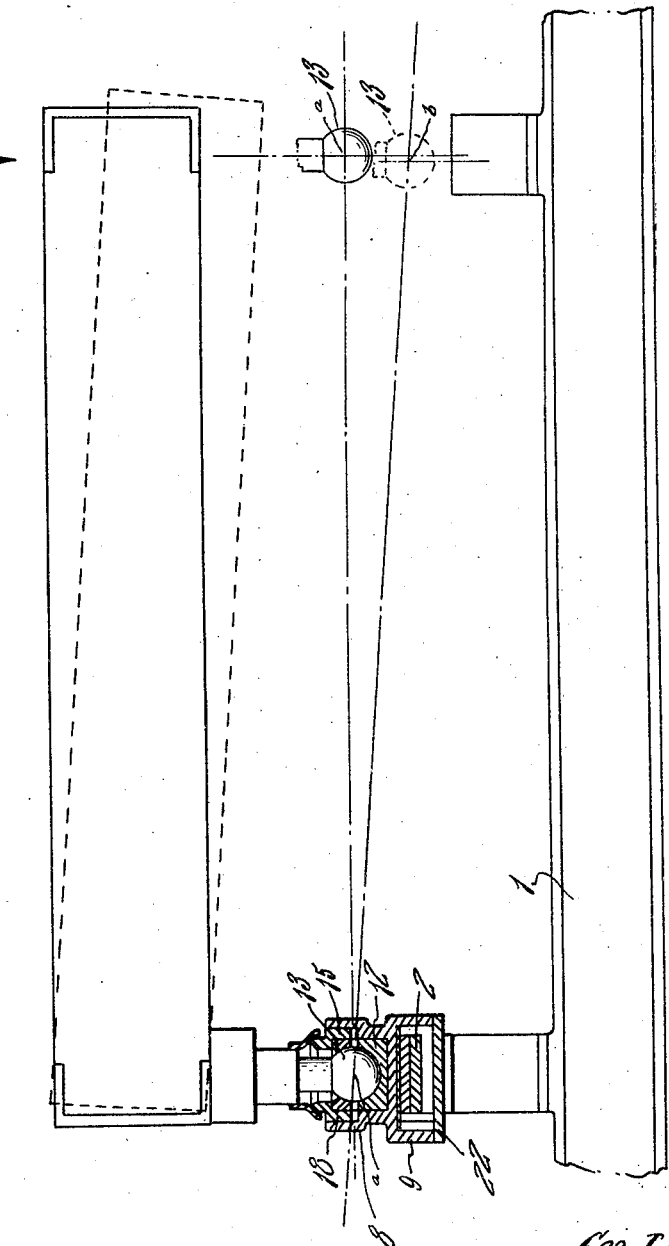

Patented Sept. 7, 1926.

1,598,679

UNITED STATES PATENT OFFICE.

GEORGE J. FLETCHER AND WILLIAM M. JAMES, OF CHICAGO, ILLINOIS.

VEHICLE SPRING SUPPORT.

Application filed January 2, 1925. Serial No. 228.

This invention relates to new and useful improvements in vehicle springs and more particularly to supporting means for connecting the ends of the spring to the body of the vehicle. The main object of our invention is the provision of a vehicle spring having improved means for connecting the ends of the springs to the body of the vehicle and permit movement of the vehicle and spring relative to each other without twisting or distorting the spring member, as is the usual case with spring attachments in use at the present time.

It is a well-known fact that when a heavy load is placed upon a vehicle and at one side thereof so as to bring the weight of the load upon one of the springs, it has a tendency to twist or distort the spring member to such extent that either the attaching member for the spring or the leaves thereof become broken due to the fact that there is no relative movement between the body and the spring members and it is, therefore, one of the principal objects of our invention to provide a connection between the ends of the spring and the vehicle body whereby to permit relative movement of the body and spring members and thus eliminate the application of the strain directly on the connector.

Another object of our invention is the provision of novel means for lubricating the various parts of the connector so that a free movement of the parts is assured to permit relative movement of the body and springs regardless of the load placed thereon.

With the above and other objects in view, the invention consists in the novel features of construction, the combination and arrangement of parts hereinafter more fully set forth, pointed out in the claims and shown in the accompanying drawings, in which:—

Fig. 3 is a vertical sectional view of the connector at the bracket end of the spring.

Fig. 4 is a vertical sectional view of the connector in the shackle end of the spring.

Fig. 5 is a side elevation, parts broken away and in section, of the bearing sleeve and ball, Fig. 7 is a diagrammatic view, illustrating the operation under load.

Figure 1:
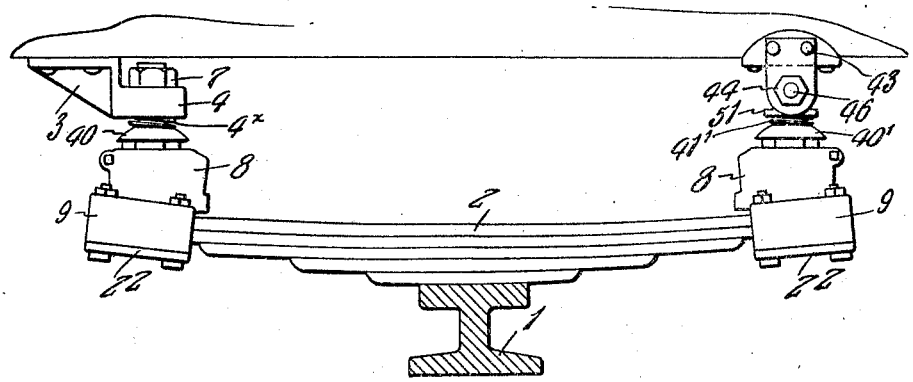
Fig. 1 is a side elevation of the spring member, illustrating our improved connection between the ends of the spring and the body of the vehicle.
Figure 2:
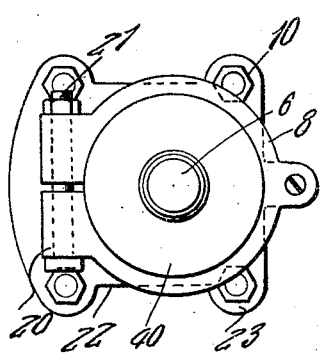
Fig. 2 is a plan view.

Referring now more particularly to the drawings, the numeral 1 indicates an axle of a vehicle on which the springs 2 are mounted. The springs in the present instance are illustrated as of the leaf type with our improved hangers or supports at each end thereof. The hanger which connects the end of the spring 2 to the body of the vehicle includes a bracket 3 which is bolted or otherwise secured to the bottom of the vehicle as shown in Figure 3 and has a flange 4 provided with a central opening 5 in which the shaft 6 is mounted. The upper end of the shaft 6 is threaded and mounted thereon is a nut 7 which retains the shaft in the bearing opening 5.

The main portion of the hanger comprises a body 8 which is provided at its lower end with downturned flanges 9 and formed integral with the flanges are the ears 10 which have bolt-receiving openings therein. The main portion of the body 8 is provided with a central chamber 11 in which is fitted a bearing block 12 adapted to receive the ball 13 formed upon the lower end of the shaft 6. The ball 13 is retained within the concavity 14 in the block 12 by means of a retaining sleeve 15 which is threaded into an enlarged portion 16 at the upper end of the chamber 11. The inner end of the sleeve 15 is provided with an internal or inner recess 17 and adapted to receive a cone ring 18 which engages the ball 13 in spaced relation with the concavity 14 for securely retaining the ball 13 in the concavity 14.

In order that the sleeve 15 may be retained against rotative movement one side of the body 8 is cutaway as at 19 and perforated ears 20 extend outwardly from the body through which a clamping bolt 21 extends in order to bring the threaded walls of the body into gripping engagement with the threaded exterior of the sleeve 15 after the same has been placed in position for retaining the ball 13 in the cavity 14.

A base plate 22 is provided having perforated ears 23 thereon which are adapted to align with the ears 10 to receive securing bolts which attach the base 22 to the body 8.

Arranged within the downturned flanges 9 of the body and mounted upon the base 22 is a bearing plate 24 having formed therein a recess 25 in its upper face for receiving at least two of the leaves of the spring 2 as shown in Figure 3. One of these leaves extend beyond the ends of the other and is turned downwardly as at 26 and engaged within an opening 27 formed in the plate 24 to prevent longitudinal movement of the end of the spring member with respect to the base 22.

It will be apparent that the plate 24 is retained against movement with respect to the base 22 by means of a headed pin 28 which is fitted into an opening 29 in the base 22 with the head 30 thereof resting upon the upper face of the base 22 and disposed within an opening 31 formed in the plate 24.

As shown in Figure 3 the plate 24 does not fill the entire space within the flanges 9 and in order to eliminate rattling a wear plate 32 is arranged between the edges of the plate 24 and the flanges 9. It will also be apparent that there will be considerable wear between the uppermost leaf of the spring and the lower face of the body 8 due to the contact therewith and in order to compensate for this wear a wear plate 33 is inserted between the lower face of the body 8 and the upper face of the uppermost spring leaf, said wear plate being retained in position by having an upturned flange 34 at its inner end engaging within a suitable recess formed in the bottom of the body 8.

Our improved spring support is thoroughly lubricated through a filling conduit 35 which communicates through a conduit 36 with the arcuate groove 37 in the cavity 14 surrounding the ball 13. It will be noted that the sleeve 15 is spaced from the shaft 6 providing a chamber 38 in which lubricant may be placed and in order to retain the lubricant in the chamber 38 a wiping felt 39 is carried by the upper end of the sleeve 15, being fitted into a circular recess formed in the upper edge of the sleeve as clearly illustrated in Figure 3 and adapted to contact with the inner surface of the dome-shaped cap 40. The bottom of the block 12 is provided with an opening 12' to receive lubricant in the cavity 14 from the conduit 36, as shown in Figures 3 and 4. The cap 40 is yieldably retained into engagement with the wiper 39 through the tension of a coil spring 41 which is disposed between the top of the cap and the flange 4. A lubricant is conveyed to the chamber formed by the downturned flange 9 through a conduit 42 which communicates with the groove 37 in the cavity 14 thus conveying lubricant to the wear plate 33 and other parts at the lower end of the body.

The conduit 42 is to have arranged therein a capillary wick or similar article to limit the flow of the lubricant to the wear plate 33. Shim plates 43' are mounted upon the base plate 22 disposed beneath the downturned flanges 9 of the body 8, said shim plates having perforated ears to receive the fastening bolts 21 which connect the body 8 and base plate 22.

The supporting member at the shackle end of the spring or the inner end thereof is constructed in a similar manner with the exception of the connection between the ball and shaft, and shackle and bracket. In this form of the invention the cone ring 18' is to be formed in two pieces in order to permit the same to be placed in position within the recess 17' prior to having the ball 13' seated in the ring. The bracket 43 is secured to the body of the vehicle in any desired manner and has spaced perforated ears 44 between which the bearing sleeve 45 is arranged, a bolt 46 being passed through the ears 44 and sleeve 45 in order to connect the support to the shackle. The sleeve 45 is provided with an inner bearing sleeve 47 having an annular groove recess 48 which communicates with a central lubricant conduit 49 formed in the shaft 6' and ball 13' for receiving a capillary wick 50 which conveys liquid from the cavity 14 to the annular groove 48 containing a capillary element and lubricates the shackle.

In this form of the invention the shaft 6' is provided with an annular flange 51 directly below the sleeve 47 and arranged between the flange 51 and the cap 40' is a coil spring 41' which retains the cap 40' in position against the wiper 39'. It will be apparent that the remaining construction of the support in the inner end of the spring is the same as that described for the support at the forward end and which is more particularly illustrated in Figure 3.

Figure 6:
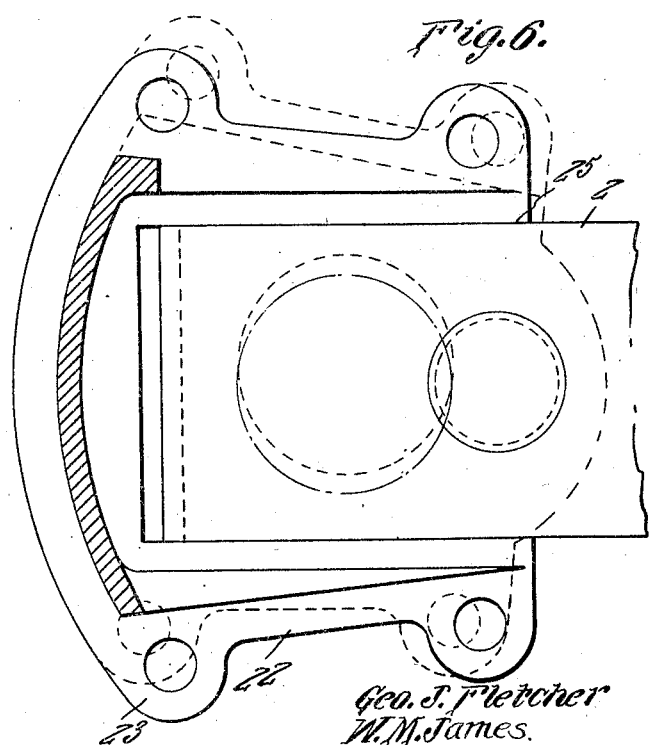
Fig. 6 is a top plan view of the base plate with one end of the spring member in position, showing the relative movement under load in dotted line.

In Figure 7, we have illustrated a diagrammatic view in order to bring out the action of the support when a load is applied to one side of a vehicle. It will be noted that in this view that the load has been applied to the right-hand side of the vehicle, the normal center point of the spring supports being directly on a horizontal line between the bearing balls upon opposite sides of the vehicle. When the load is applied to one side of the vehicle, the center of the balls upon that side of the vehicle to which the load is applied is moved inwardly as shown at b, this movement being again illustrated in Figure 6 where it is noted that in dotted lines the parts are moved laterally and from this movement it will be noted that the connection between the rigid portion attached to the vehicle and the portion which is attached to the spring are permitted to move laterally with respect to each other, due to the ball and socket connection and thus eliminate the strain and stress which is usually applied either to the spring or to the hanger or to both and ofttimes either breaking the hanger or the spring. It will be noted that through the movement of the body 8 and the base plate 22 the base plate will rotate around the pin 28 as a pivot.

It will be noted from the construction that a universal joint which includes the ball 13 and shaft 6, together with the lock 12 and cone ring 18, is immersed in a lubricant bath so as to provide for positive lubrication at all times and at the same time prevent the accumulation of dirt in the joint.

It will also be noted that by providing the universal connection between the brackets and spring member, it will eliminate any strain on the bushing 47. The sleeve 15 may be moved downwardly in the enlarged portion 16 in order to take up any wear between the ball and the cavity as well as the interior of the cone ring. Attention is directed to the fact that the limit of the lateral movement between the interior of the sleeve 15 and the shaft 6 is limited to the space between the shaft and sleeve so as to reduce the amount of rebound to a minimum.

While we have shown and described the preferred form of our invention, it will be obvious that various changes in the details of construction and in the proportions may be resorted to for successfully carrying our invention into practice without sacrificing any of the novel features or departing from the scope of the appended claims.

Having thus described our invention, what we claim is:—

1. A spring support including a body member, a shaft, means forming universal connection between the shaft and body member and means forming pivotal connection between the body and spring.

2. In combination a vehicle body, springs therefor and brackets attached to the body adjacent the ends of the springs, of means forming connection between the brackets and the ends of the springs including a body having a chamber therein, a bearing block within the chamber, a sleeve threaded into the chamber in opposed relation with the bearing block, said bearing block having a concavity therein, a shaft carried by the bracket, a ball on the end of the shaft resting in the concavity, means carried by the sleeve for retaining the ball in the concavity and means forming connection between the body and the ends of the springs to permit lateral movement of the body relative to the springs.

3. In combination a vehicle body, springs therefor and brackets carried by the body, of connecting means between the ends of the springs and the brackets including a body, means providing universal connection between the body of the connection means and the brackets and means connecting the last mentioned body with the ends of the springs to permit lateral movement of the vehicle body relative to the springs.

4. In combination a vehicle body, springs therefor, and brackets carried by the body adjacent the ends of the springs, of means forming universal connection between the brackets and the springs and additional means forming pivotal connection between the first means and the ends of the springs whereby to permit lateral movement on the part of the vehicle body relative to the springs.

5. A device of the character described including a body member having a chamber therein, a bearing block in the chamber, a semi-spherical cavity in the bearing block, a removable sleeve in the end of the chamber opposite the bearing block, a shaft extending through the sleeve, a ball on the inner end of the shaft resting in the cavity, a cone ring carried by the sleeve engaging the ball and in opposed relation with the cavity and means forming connection between the body and the vehicle spring whereby to permit lateral movement of the body relative to the springs.

6. A device of the character described including a body member, a shaft, means forming universal connection between the shaft and body member, flanges on the body, a base plate engaged with lower edges of the flanges forming a chamber between the bottom of the body and the base plate, a bearing plate in said chamber having a recess for receiving the end of the spring member, means connecting the end of the spring member with the bearing plate and a pivot pin between the bearing plate and base plate whereby to permit lateral movement of the body member with respect to the bearing plate and the end of the spring.

7. A spring support including a body member, a base plate attached to the body, a bearing plate upon the base plate, means connecting the end of the spring member with the bearing plate and a pivot pin between the bearing plate and base plate whereby to permit lateral movement of the body member relative to the bearing plate and the end of the spring.

8. A device of the character described including a body member having a chamber therein, a bearing block in the chamber, a semispherical cavity in the portion block, a removable sleeve in the end of the chamber opposite the bearing block, a shaft extending through the sleeve, a ball on the inner end of the shaft resting in the cavity and means forming pivotal connection between the body and the spring whereby to permit lateral movement of the body relative to the spring.

9. A spring support including a body member and a spring, a shaft, means forming universal connection between the shaft and the body, and means providing connection between the body member and the spring permitting lateral movement on the part of the body member relative to the spring.

10. A spring support including a body member and a spring, a shaft, a connection between the shaft and the body permitting movement therebetween, and means providing connection between the shaft and the spring permitting lateral movement on the part of the body member relative to the spring.

11. A structural unit of the class described including a body member, a spring member provided with a retaining end portion, and a support carried by the body member and provided with a recess adapted to receive the retaining end portion.

12. A structural unit of the class described including a body member, a supporting member carried by the body member, a spring member having an angled end portion, and means carried by the support engaging the angled end portion for retaining the spring member in operative connection with the support.

13. A structural unit of the class described including a body member, a supporting member carried by the body member, and provided with a recessed portion, and a spring member having a portion extending into the support and an end portion positioned in the recess of the portion.

In testimony whereof we affix our signatures.

GEORGE J. FLETCHER.
WILLIAM M. JAMES.